United States Patent Office 3,378,552
Patented Apr. 16, 1968

3,378,552
IMIDAZOLE COMPOUNDS AND METHODS
OF MAKING THE SAME
David W. Henry, Plainfield, N.J., assignor to Merck &
Co., Inc., Rahway, N.J., a corporation of New Jersey
No Drawing. Filed Aug. 7, 1963, Ser. No. 300,634
8 Claims. (Cl. 260—240)

This invention relates to a new and novel synthesis of 1-substituted-5-nitroimidazole-2-carboxylates. More particularly, it relates to the preparation of 1-alkyl and 1-hydroxyalkyl-5-nitroimidazole-2-carboxylates from the corresponding 2-($\beta$-substituted vinyl) imidazoles. It is concerned further with the synthesis of 1-alkyl and 1-hydroxyalkyl-2-($\beta$-substituted vinyl)-5-nitroimidazoles from the corresponding 2-methylimidazoles. Still further, it is concerned with the novel 1-alkyl and 1-hydroxyalkyl-2-($\beta$-substituted vinyl)-5-nitroimidazoles obtained in such synthesis.

It has recently been found that certain 1-loweralkyl and 1-hydroxyloweralkyl-5-nitroimidazole-2-carboxamides have a high degree of anti-trichomonal and anti-histomonal activity. Such compounds are thus of value against turkey blackhead disease and the human protozoan disease *T. vaginalis* vagnitis. It has further been found that salts of 1-loweralkyl and 1-hydroxyloweralkyl-5-nitroimidazole-2-carboxylic acid are key intermediates in chemical synthesis of these carboxamides. It is the object of the present invention to provide new, improved chemical processes for the preparation of 1-loweralkyl and 1-hydroxyloweralkyl-5-nitroimidazole-2-carboxylic acid salts. It is a further object to provide such new processes wherein the corresponding 2-methylimidazole is the starting material. A further object is provision of novel compounds obtained and useful as intermediates in such processes.

The new chemical processes which are among the objects of this invention may be pictured structurally as follows:

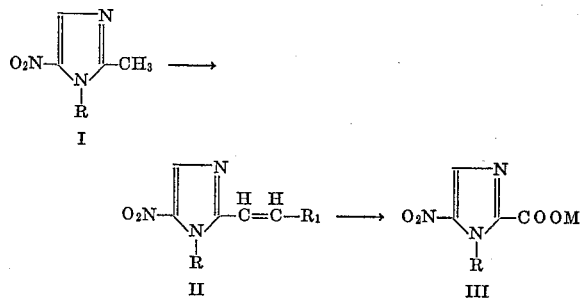

In the above formulas M represents a metal, and preferably an alkaline or alkaline earth metal such as sodium, potassium, lithium, calcium, barium and the like. When M is a divalent metal it will, of course, combine with two of the imidazole carboxylate anions. R represents a lower alkyl groups such as methyl, ethyl, propyl and the like, or a hydroxyalkyl radical of the type exemplified by hydroxethyl, hydroxypropyl and hydroxybutyl. It is preferred that R contain less than five carbon atoms. When R is hydroxyalkyl the alkyl radical should contain at least two carbon atoms, and the hydroxy group should not be on the $\alpha$-carbon atom (in relation to the imidazole ring). $R_1$ in Formula II above represents an aromatic ring corresponding to the aromatic aldehyde which is used in the first step of the process to activate the 2-methyl group of the imidazole. $R_1$ preferably represents phenyl, furyl, halophenyl such as p-chlorophenyl, p-bromophenyl, o-chlorophenyl, m-fluorophenyl, p-fluorophenyl, and tolyl (methylphenyl) which may be o, m or p-tolyl.

In the first step of the process, a 1-R-2-methyl-5-nitroimidazole, where R is as previously defined, is treated with an aromatic aldeyhde in the presence of a strong base to form a 1-R-2-($\beta$-substituted vinyl)-5-nitroimidazole having the general Formula II. The particular aromatic aldehyde used in the reaction is not critical. It is preferred that benzaldehyde be employed as the activating aldehyde in this reaction, in which case the reaction product is 1-R-2-($\beta$-phenyl vinyl)-5-nitroimidazole of the formula:

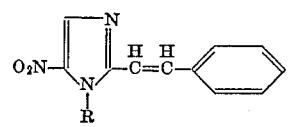

However, the aromatic or heteroaromatic aldehydes are equally satisfactory and may be used if desired. For instance, it is possible to employ halo, nitro, hydroxy or alkyl substituted benzaldehyde or hetero compounds such as furaldehyde, thiophenealdehyde and the like.

It is a critical and essential feature of this step of my process that the reaction of the 1-R-2-methyl-5-nitroimidazole with the aromatic aldehyde be carried out in the presence of a strong base. As the base, it is preferred to employ an alkali or alkaline earth metal alkoxide such as sodium ethoxide, potassium t-butoxide, sodium isopropoxide, potassium methoxide and the like. However, alkali metal hydroxides such as sodium or potassium hydroxide may be used if desired, as may metal amides such so sodamide or potassium amide. Weaker bases such as pyridine or piperidine are not, however, satisfactory.

The reaction is carried out using from about 0.5–2.5 moles of base per mole of 1-R-2-methyl-5-nitroimidazole, and preferably about 1.5–2 moles of base per mole of imidazole. Larger amounts of base do not adversely affect the reaction and can be used, but there is little apparent advantage in doing so.

Normally a molar excess of the aromatic aldehyde reactant is used (over the imidazole compound) and good results are achieved with from about 2–8 moles of aldehyde per mole of imidazole.

The reaction is conducted in a suitable solvent medium. When an alkali metal alkoxide is the base, a lower alkanol such as methanol, ethanol, isopropanol or butanol is the usual solvent and is quite satisfactory. An aqueous solvent such as an aqueous alkanol may be used when an alkali metal hydroxide serves as the base. Dimethylformamide is an example of another suitable solvent. It is desirable that the reaction mixture be homogeneous so that in selecting a solvent, one should be chosen which will solubilize both the imidazole and the aromatic aldehyde.

The reaction time and temperature are not unduly critical. Good results are obtained when the condensation is brought about at elevated temperatures of about 50–100° C. for periods of time of 10 minutes to 2 hours. The desired formation of the aldehyde condensation product will take place at room temperature, although longer reaction times are required to obtain optimum yields.

The 1-R-2-($\beta$-substituted vinyl)-5-nitroimidazole, where R is as defined above, may be recovered from the reaction mixture by methods known to those skilled in the art. The compounds are quite insoluble in alcohols, so that when an alcohol serves as reaction solvent they may be isolated in substantially pure form by direct filtration or centrifugation of the reaction mixture.

Examples of compounds of general Formula II which are produced by this process are 1-methyl-2-($\beta$-phenylvinyl)-5-nitroimidazole, 1-ethyl-2-($\beta$-phenylvinyl)-5-nitroimidazole, 1-(2-hydroxyethyl)-2-($\beta$-phenylvinyl)-5-nitroimidazole, 1-methyl-2-($\beta$-furylvinyl)-5-nitroimidazole, 1-(2-hydroxyethyl)-2-[β-(p-nitrophenyl) vinyl]-5-nitroimidazole, 1-(3-hydroxypropyl)-2-(β-phenylvinyl)-5-nitroimidazole, 1-ethyl-2-[β-(p-bromophenyl) vinyl]-5-nitroimidazole and 1-(2-hydroxyethyl) - 2 - [β-(o-tolyl) vinyl]-5-nitroimidazole.

In the second step of the process of this invention the 1-R-2-(β-substituted vinyl)-5-nitroimidazole compounds described above are oxidized to the corresponding 1-R-5-nitroimidazole-2-carboxylic acid salts. As oxidizing agent it is preferred to use an alkali or alkaline earth metal permanganate such as sodium, potassium, calcium or barium permanganate. The oxidation is brought about by intimately contacting the 1-R-2-(β-substituted vinyl)-5-nitroimidazole and the oxidizing agent in a suitable solvent medium. The process is conveniently conducted at room temperature or below, with a slight excess of oxidizing agent being used in order to insure optimum yields of desired product. Completion of the oxidation is readily recognized by one skilled in the art by disappearance or fading of the characteristic purple color of the permanganate ion. In the usual solvent media such as acetone, methyl ethyl ketone, methyl isobutyl ketone and the like, the imidazole acid salt and the manganese dioxide formed during the oxidation are both insoluble. The 1-R-5-nitroimidazole-2-carboxylic acid alkali metal salts are, however, water soluble and are conveniently separated from the manganese dioxide using this property. In this way, there are obtained salts of 1-R-5-nitroimidazole-2-carboxylate, where R is a loweralkyl radical such as methyl, ethyl, propyl or butyl, or a hydroxy loweralkyl radical having at least two carbon atoms such as 2-hydroxyethyl and 3-hydroxypropyl. The particular salt recovered will correspond to the salt of permanganic acid used as oxidizing agent. Alkali metal salts are preferred for the further preparation of the biologically active 1-R-5-nitroimidazole-2-carboxamides.

The 1-R-2-(β-substituted vinyl)-5-nitroimidazoles and 1-R-5-nitroimidazole-2-carboxylates (of Formulas II and III respectively) are useful intermediates in syntheses of 1-loweralkyl-5-nitroimidazole-2-carboxamide and 1-(hydroxy loweralkyl)-5-nitroimidazole-2-carboxamide, which amides are highly active as antihistomonal and antitrichomonal agents, and are thus of value in the treatment of enterohepatitis in turkeys (turkey blackhead disease) and *T. vaginalis* vaginitis in humans. The compounds of Formula III above are converted to the corresponding 1-R-5-nitroimidazole-2-carboxamides by a process that comprises reacting a salt of 1-R-5-nitroimidazole-2-carboxylic acid (Formula III) with oxalyl chloride to produce the 1-R-5-nitroimidazole-2-carbonyl chloride, treatment of this carbonyl chloride with ethanol in the presence of pyridine to form ethyl 1-R-5-nitroimidazole-2-carboxylate, and reaction of this latter substance with ammonia. Alternatively, the 1-R-5-nitroimidazole-2-carbonyl chloride may be treated directly with ammonia to form 1-R-5-nitroimidazole-2-carboxamide. Detailed directions for converting the imidazole-2-carboxylates obtained according to the present invention to the anti-trichomonal and anti-histomonal 1-substituted-5-nitroimidazole-2-carboxamides are set forth in the following examples. The 1-R-5-nitroimidazole-2-carboxamides and methods of making them from the compounds of Formula III hereinabove are not part of the present invention, but are rather the invention of my colleague, Dale R. Hoff, and form the subject matter of a pending United States patent application Ser. No. 300,629 filed by him on even date herewith.

The following examples are given for the purpose of illustration and not by way of limitation.

EXAMPLE 1

1-methyl-2-(β-phenylvinyl)-5-nitroimidazole 5 grams of 1,2-dimethyl-5-nitroimidazole (0.035 M) and 18 ml. of benzaldehyde (0.18 M) are added to a mixture of 90 ml. of absolute ethanol and 6 grams of potassium t-butoxide (0.054 M). The resulting mixture is heated at 70–75° C. in a water bath for 20 minutes. It is then cooled in an ice bath and the solid precipitate of 1-methyl-2-(β-phenylvinyl)-5-nitroimidazole removed by filtration. The solid is washed first with ethanol and then with water. The remaining crystalline product is 1-methyl-2-(β-phenylvinyl)-5-nitroimidazole, M.P. 198–199° C. after air drying.

When the above reaction is repeated using 0.035 M of 1-ethyl-2-methyl-5-nitroimidazole or 1-propyl-2-methyl-5-nitroimidazole in place of 1,2-dimethyl-5-nitroimidazole, there is obtained 1-ethyl-2-(β-phenylvinyl)-5-nitroimidazole and 1-propyl-2-(β-phenylvinyl)-5-nitroimidazole, respectively.

EXAMPLE 2

1-methyl-2-(β-phenylvinyl)-5-nitroimidazole 64 mg. (0.45 mmol) of 1,2-dimethyl-5-nitroimidazole is added to 0.06 ml. (0.6 mmol) of benzaldehyde in 1 ml. of absolute ethanol containing 33 mg. of 85% potassium hydroxide (0.5 mmol), and the resulting mixture heated at 60–65° C. for 15 minutes. The reaction mixture is then cooled to 10–15° C. and the solid 1-methyl-2-(β-phenylvinyl)-5-nitroimidazole removed by filtration. The solid product is washed with ethanol and dried.

Example 3

1-(2-hydroxyethyl)-2-(β-phenylvinyl)-5-nitroimidazole 1.0 gm. of 1 - (2 - hydroxyethyl)-2-methyl-5-nitroimidazole, 1 ml. of benzaldehyde and 500 mg. of sodium methoxide are dissolved in 20 ml. of ethanol and the mixture warmed to 70° C. for 25 minutes. The mixture is then cooled to room temperature and an equal volume of water is added. The resulting precipitated 1-(2-hydroxyethyl)-2-(β-phenylvinyl)-5-nitroimidazole is collected by filtration and air-dried. It is recrystallized from ether and then from ethyl acetate to give substantially pure material, M.P. 156–158° C.

Using an equimolar amount of 1-(3-hydroxypropyl)-2-methyl-5-nitroimidazole in place of 1-(2-hydroxyethyl)-2-methyl-5-nitroimidazole, there is produced 1-(3-hydroxypropyl)-2-(β-phenylvinyl)-5-nitroimidazole.

Example 4

(A) 1-methyl-2-[β-(p-chlorophenyl) vinyl]-5-nitroimidazole

A mixture of 1.41 gm. of 1,2-dimethyl-5-nitroimidazole (10 mmol), 5.0 gm. of p-chlorobenzaldehyde (36 mmol) and 25 ml. of dry ethanol containing 0.55 gm. of dissolved sodium (24 mmol) is heated at 75° C. for 20 minutes. The reaction mixture is cooled and the resulting crystalline mass broken up. The whole is filtered. The solids are washed with alcohol, water and again with alcohol. There remain yellow-orange crystals of 1-methyl-2-[β-(p-chlorophenyl) vinyl]-5-nitroimidazole, M.P. 247–248° C.

When the above experiment is repeated using 4.3 gm. of p-tolualdehyde in place of the p-chlorobenzaldehyde, 1-methyl-2-[β-(p-tolyl) vinyl]-5-nitroimidazole is obtained, M.P. 222–224° C.

(B) 1-methyl-2-[β-(2-furyl) vinyl]-5-nitroimidazole

A mixture of 1.0 gm. of 1,2-dimethyl-5-nitroimidazole, 3.5 ml. of 2-furaldehyde and 18 ml. of absolute ethanol containing 10.7 mmol of potassium ethoxide is heated at 70–75° C. for 30 minutes. The mixture is then cooled in ice, filtered and the recovered solid washed with ethanol and with water. The remaining solid 1-methyl-2-[β-(2-furyl) vinyl]-5-nitroimidazole is recrystallized from methanol to give substantially pure material, M.P. 174–176° C.

Example 5

Potassium 1-methyl-5-nitroimidazole-2-carboxylate 25 grams of potassium permanganate is added in small portions, and with stirring, to a cold mixture of 12.5 grams of 1-methyl-2-(β-phenylvinyl)-5-nitroimidazole and 120 ml. of acetone. The addition of oxidizing agent is carried out at such a rate that the temperature of the reaction mixture remains between 10 and 15° C. About 90 minutes is required. When the addition of permanganate is complete and the mixture shows no more permanganate color, 240 ml. of water is added with stirring and continued cooling. The resulting solution is then filtered and the solid manganese dioxide washed with 360 ml. portions of water. The filtrate and washings are combined and the acetone removed by concentration in vacuo below room temperature. The remaining aqueous solution is lyophilized to give solid potassium 1 - methyl-5-nitroimidazole-2-carboxylate admixed with minor amount of inorganic salts.

The potassium salts of 1-ethyl and 1-propyl-5-nitroimidazole-2-carboxylic acid are obtained in like fashion by potassium permanganate oxidation of 1-ethyl and 1-propyl-2-(β-phenylvinyl)-5-nitroimidazole, respectively.

Similar results are obtained when either sodium or barium permanganate is used as oxidizing agent instead of potassium permanganate.

Example 6

Potassium-1-(2-hydroxyethyl)-5-nitroimidazole-2-carboxylate 471 mg. of 1 - (2-hydroxyethyl)-2-(β-phenylvinyl)-5-nitroimidazole in 10 ml. of acetone is treated with 767 mg. of potassium permanganate at 0° C. The solvent is then removed in vacuo and the residue extracted with water. The aqueous extract is lyophilized to afford an amorphous residue of potassium-1-(2-hydroxyethyl)-5-nitroimidazole-2-carboxylate. The potassium salts of 1-(3-hydroxypropyl) - 5 - nitroimidazole-2-carboxylate is prepared by the same procedure from 1 - (3-hydroxypropyl)-2-(β-phenylvinyl)-5-nitroimidazole.

The potasium - 1-(2-hydroxyethyl)-5-nitroimidazole-2-carboxylate is added to 15 ml. of oxalyl chloride and the mixture refluxed for one hour. The excess oxalyl chloride is removed by concentration in vacuo, and the residue treated with cold aqueous ammonia. The resulting mixture is extracted with an equal volume of ethyl acetate. The ethyl acetate extract is concentrated to dryness to afford 1 - (2 - hydroxyethyl) - 5 - nitroimidazole - 2 - carboxamide, M.P. 154–155° C.

Example 7

Sodium-1-methyl-5-nitroimidazole-2-carboxylate

When the 1-methyl-2-(β-substituted vinyl)-5-nitroimidazole compounds of Example 4 are treated with sodium permanganate in acetone according to the procedure of Example 5, sodium-1-methyl-5-nitroimidazole-2-carboxylate is obtained.

Example 8

(A) Ethyl-1-methyl-5-nitroimidazole-2-carboxylate 470 milligrams of potassium-1-methyl-5-nitroimidazole-2-carboxylate is refluxed for 30 minutes with 5 ml. of oxalyl chloride. Most of the excess oxalyl chloride is then removed by concentration in vacuo, and the last traces are removed by adding 3–4 ml. of benzene to the residue and similarly evaporating the benzene. The remaining solid residue is then dissolved in a mixture of 5 ml. of dry ethanol and 1 ml. of dry pyridine. This mixture is allowed to stand at room temperature for 30 minutes and then diluted with 40–50 ml. of methylene dichloride. It is extracted once with an excess of dilute hydrochloric acid, and then with dilute sodium bicarbonate. The organic solvent solution is finally dried over sodium sulfate and evaporated in vacuo to give an oil which partially crystallizes on standing.

This oil is dissolved in about 5 ml. of ether, and about 5 ml. of petroleum ether is added. Most of the ether is then boiled off leaving a cloudy solution which is placed on a 3 gm. $Al_2O_3$ (Merck basic) column prepared in petroleum ether. The column height is about equal to its diameter. The column is eluated with about 40 ml. of petroleum ether which removes primarily ethyl benzoate. It is then eluted with about 40 ml. of ether-ethylene dichloride (4:1) which removes ethyl-1-methyl-5-nitroimidazole-2-carboxylate. This second fraction is evaporated to dryness in vacuo to give a residue consisting of ethyl-1-methyl-5-nitroimidazole - 2-carboxylate. It is recrystallized by dissolving in 2 ml. of ether, adding 2 ml. of petroleum ether and concentrating until the solution becomes slightly cloudy. On cooling ethyl-1-methyl-5-nitroimidazole-2-carboxylate crystallizes, M.P. 80–81° C.

(B) 1-methyl-5-nitroimidazole-2-carboxamide 50 milligrams of ethyl-1-methyl-5-nitroimidazole-2-carboxylate is dissolved in 40 ml. of very dry ethanol and a moderate stream of anhydrous ammonia bubbled into the solution for 15 minutes. The resulting crystalline product is filtered off and washed with a little ethanol. It is 1-methyl-5-nitroimidazole-2-carboxamide, M.P. 217–218° C.

The above procedure is repeated using potassium-1-ethyl-5-nitroimidazole - 2 - carboxylate and potassium-1-propyl-5-nitroimidazole-2-carboxylate as starting material. There is obtained first the corresponding ethyl ester of each of the acids, which on ammonia treatment affords 1-ethyl-5-nitroimidazole-2-carboxamide and 1-propyl-5-nitroimidazole-2-carboxamide.

These 1-loweralkyl-5-nitroimidazole-2-carboxamide and 1-hydroxyloweralkyl-5-nitroimidazole - 2 - carboxamide compounds are effective against turkey blackhead disease when fed to turkeys at levels of 0.006–0.0125% by weight in the feed.

The 1-loweralkyl-2-methyl-5-nitroimidazoles used as starting materials in the process of this invention are readily prepared by alkylation of the known 2-methyl-4(5)-nitroimidazole with the appropriate alkyl sulfate. Thus 1,2-dimethyl-5-nitroimidazole is prepared as follows:

29.0 grams of 2-methyl-4(5)-nitroimidazole (.23 mol) are mixed with 29.0 gm. of dimethyl sulfate (.23 mol) in a 1.1 flask and the resulting mixture heated on the steam bath. When the temperature reaches about 70° C., reaction starts and the flask is removed from the steam bath. The temperature rises to 150° C., and after a few minutes the flask is placed in an oil bath at 125–130° C. for 15 minutes. The flask is then cooled and the product extracted into a mixture of 250 ml. of 1.2 N NaOH and 200 ml. of chloroform. The aqueous phase is extracted twice more with chloroform and the combined chloroform extracts dried over $Na_2SO_4$ and evaporated in vacuo to give 19.3 gm. of crude crystalline product. This is dissolved in 110 ml. of boiling methanol, the solution filtered and cooled to give, after filtration, 14.2 gm. of white crystalline 1,2-dimethyl-5-nitroimidazole, M.P. 139–140° C.

The 1-(hydroxyloweralkyl)-2-methyl-5-nitroimidazole starting materials are obtained by the method described in United States Patent 2,944,061 for 1(2-hydroxyethyl)-2-methyl-5-nitroimidazole.

Any departure from the above description which conforms to the present invention is intended to be included within the scope of the claims.

What is claimed is:
1. 1-loweralkyl-2-(β-phenylvinyl)-5-nitroimidazole.
2. 1-methyl-2-(β-phenylvinyl)-5-nitroimidazole.
3. 1-(2-hydroxyethyl) - 2 - (β - phenylvinyl)-5-nitroimidazole.

4. A compound having the formula

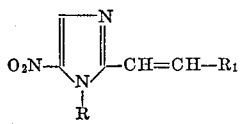

where R is selected from the class consisting of hydroxyloweralkyl having at least two carbon atoms and loweralkyl, and $R_1$ is selected from the class consisting of phenyl, furyl, halophenyl and tolyl.

5. The process for producing 1-methyl-2-(β-phenylvinyl)-5-nitroimidazole that comprises reacting 1,2-dimethyl-5-nitroimidazole with benzaldehyde in a strongly basic reaction medium containing an alkali metal lower alkoxide, an alkaline earth metal lower alkoxide, an alkali metal hydroxide or an alkali metal amide.

6. The process for producing 1-loweralkyl-2-(β-phenylvinyl)-5-nitroimidazole that comprises reacting 1-loweralkyl-2-methyl-5-nitroimidazole with benzaldehyde in a strongly basic reaction medium containing an alkali metal lower alkoxide, an alkaline earth metal lower alkoxide, an alkali metal hydroxide or an alkali metal amide.

7. The process for producing 1-(2-hydroxyethyl)-2-(β-phenylvinyl)-5-nitroimidazole that comprises reacting 1-(2-hydroxyethyl)-2-methyl-5-nitroimidazole with benzaldehyde in a strongly basic reaction medium containing an alkali metal lower alkoxide, an alkaline earth metal lower alkoxide, an alkali metal hydroxide or an alkali metal amide.

8. The process for preparing a compound of the formula

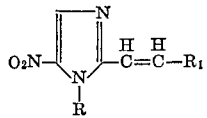

that comprises intimately contacting a compound of the formula

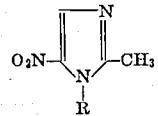

with an aldehyde of the formula $R_1$—CHO in a strongly basic reaction medium containing an alkali metal lower alkoxide, an alkaline earth metal lower alkoxide, an alkali metal hydroxide or an alkali metal amide, where R is selected from the class consisting of loweralkyl and hydroxyloweralkyl having at least two carbon atoms, and $R_1$ is selected from the class consisting of phenyl, furyl, halophenyl and tolyl.

References Cited

UNITED STATES PATENTS

| | | | |
|---|---|---|---|
| 2,671,783 | 3/1954 | Wizinger | 260—240 |
| 2,766,233 | 10/1956 | Kartinos | 260—240 |
| 2,944,061 | 7/1960 | Jacob et al. | 260—309 |
| 3,050,520 | 8/1962 | Erner et al. | 260—309 |
| 3,065,133 | 11/1962 | Tchelitcheff | 260—309 |
| 3,107,201 | 10/1963 | Hoff et al. | 260—309 |

OTHER REFERENCES

Bhagwat et al.: J. Chem. Soc., vol. 127, pp. 1832–1836 (1925).

Drefahl et al.: J. Prakt. Chem., vol. 295, pp. 225–233 (1964).

Hofmann: Imidazole and Its Derivatives, part 1, pp. 131–135 and 169, Interscience Publishers, Inc., N.Y. (1953).

John: Ber. Deut. Chem., vol. 68, pp. 2283–2291 (1935).

JOHN D. RANDOLPH, *Primary Examiner.*